United States Patent [19]
Brauns et al.

[11] Patent Number: 5,689,533
[45] Date of Patent: Nov. 18, 1997

[54] REFINED TIMING RECOVERY CIRCUIT

[75] Inventors: Gregory Thomas Brauns, Whitehall Township, Lehigh County; Ramasubramaniam Ramachandran, King of Prussia, both of Pa.

[73] Assignee: Lucent Technologies Inc., Murray Hill, N.J.

[21] Appl. No.: 584,497

[22] Filed: Jan. 11, 1996

Related U.S. Application Data

[62] Division of Ser. No. 315,783, Sep. 30, 1994, Pat. No. 5,539,784.

[51] Int. Cl.$^6$ ..................................................... H04L 7/02
[52] U.S. Cl. ............................................. 375/360; 375/371
[58] Field of Search .................................. 375/354–355, 375/359–360, 362, 371, 373; 331/1 R, 11, 25, 1 A; 327/144, 163

[56] References Cited

U.S. PATENT DOCUMENTS

| | | | |
|---|---|---|---|
| 4,584,693 | 4/1986 | Levy et al. | 375/359 |
| 4,663,769 | 5/1987 | Krinock | 375/359 |
| 4,821,295 | 4/1989 | Sanner | 375/360 |
| 4,821,297 | 4/1989 | Bergmann et al. | 375/376 |
| 4,847,870 | 7/1989 | Butcher | 375/333 |
| 4,862,482 | 8/1989 | Patchen | 375/361 X |
| 4,912,730 | 3/1990 | Erhart | 375/361 |
| 5,164,966 | 11/1992 | Hershberger | 375/359 |
| 5,491,713 | 2/1996 | Kwok et al. | 375/333 |

OTHER PUBLICATIONS

"Smart Analog™" Databook, NU Horizons Electronics Corp., Columbia, Maryland, for Crystal Semiconductor Corporation, 1989, pp. 2–98, 2–99.
Exar Databook, Exar Corporation, 2222 Qume Drive, P.O. Box 49007, San Jose, CA 95161, "XR-T5684", pp. 2–58–2–59.
AT&T Microelectronics, "MOS Transmission ICs" Data Book, 1991, T7290 DS1/T1/CEPT Line Interface, pp. 3–55–3–72.
Non–Disclosure Agreement between NEC and AT&T Corp. dated Aug. 5, 1994.

*Primary Examiner*—Young T. Tse
*Attorney, Agent, or Firm*—Scott W. McLellan

[57] ABSTRACT

Briefly, in accordance with one embodiment of the invention, a refined timing recovery circuit for retiming a recovered data signal comprises a data pulse edge detector. The recovered data signal is derived from a received data pulse. The data pulse edge detector is adapted to be coupled to an oversampling clock. The data pulse edge detector is further adapted to sense the next clock pulse edge having the closest temporal proximity after a selected received data pulse edge. In accordance with another embodiment, an integrated circuit comprises: a timing recovery system for retiming a recovered data signal derived from a received data pulse, the timing recovery system comprising a refined timing recovery circuit. The refined timing recovery circuit includes a data pulse edge detector. The data pulse edge detector is adapted to be coupled to an oversampling clock having a mutually timed series of clock pulses at a substantially predetermined frequency and is further adapted to sense the next clock pulse edge having closest temporal proximity after a selected received data pulse edge. In accordance with yet another embodiment, a method of reducing the phase quantization error of a recovered data signal derived from a received data pulse by sampling with digital clock pulses at a first substantially predetermined frequency comprising the steps of: sampling the received data pulse with digital clock pulses at a second substantially predetermined frequency so as to sense the next clock pulse edge of the digital clock pulses in closest temporal proximity after a selected edge of the received data pulse, the second substantially predetermined frequency being approximately M times the first substantially predetermined frequency; and retiming the recovered data signal substantially in accordance with the sensed next clock pulse edge.

7 Claims, 9 Drawing Sheets

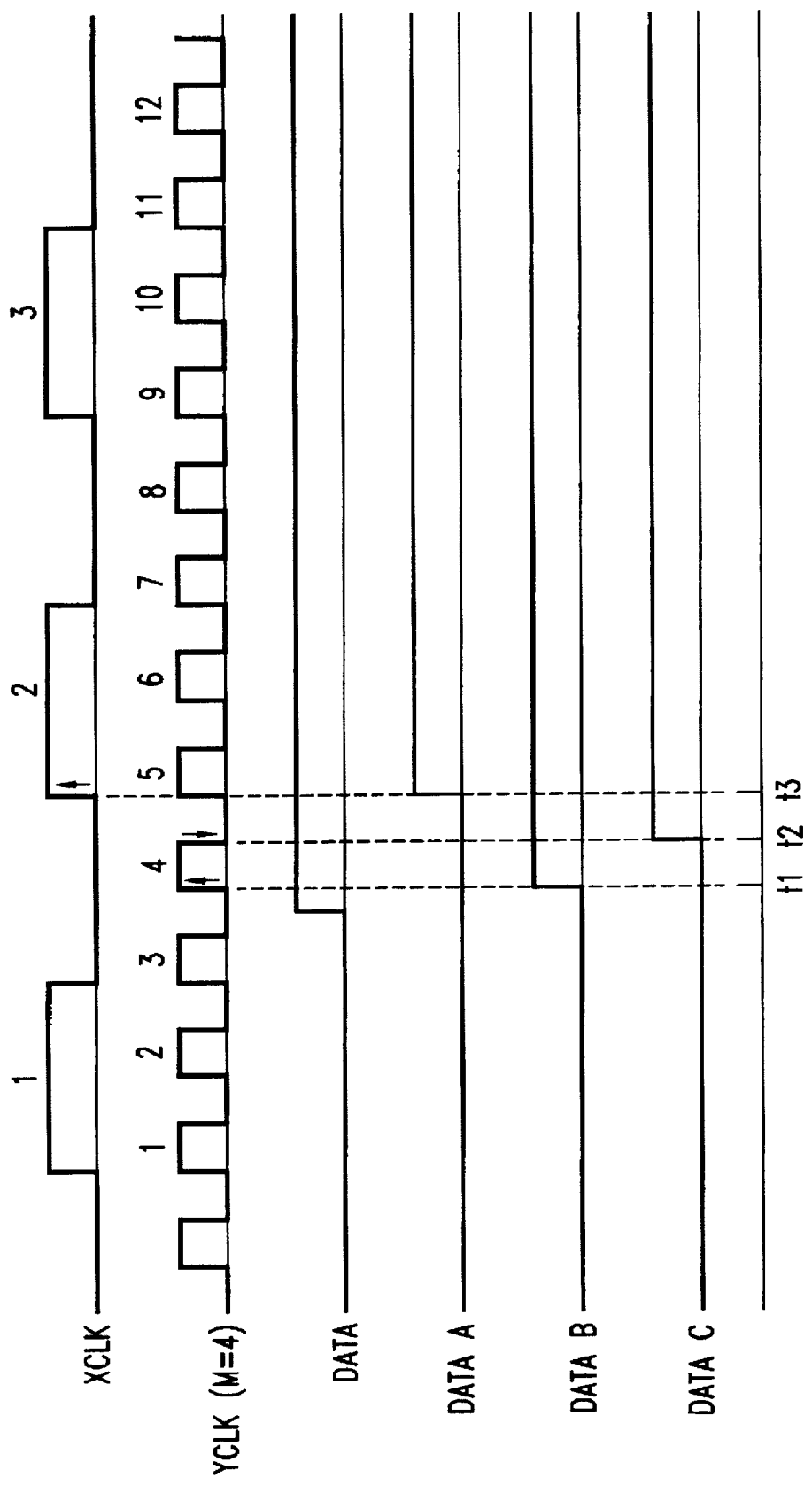

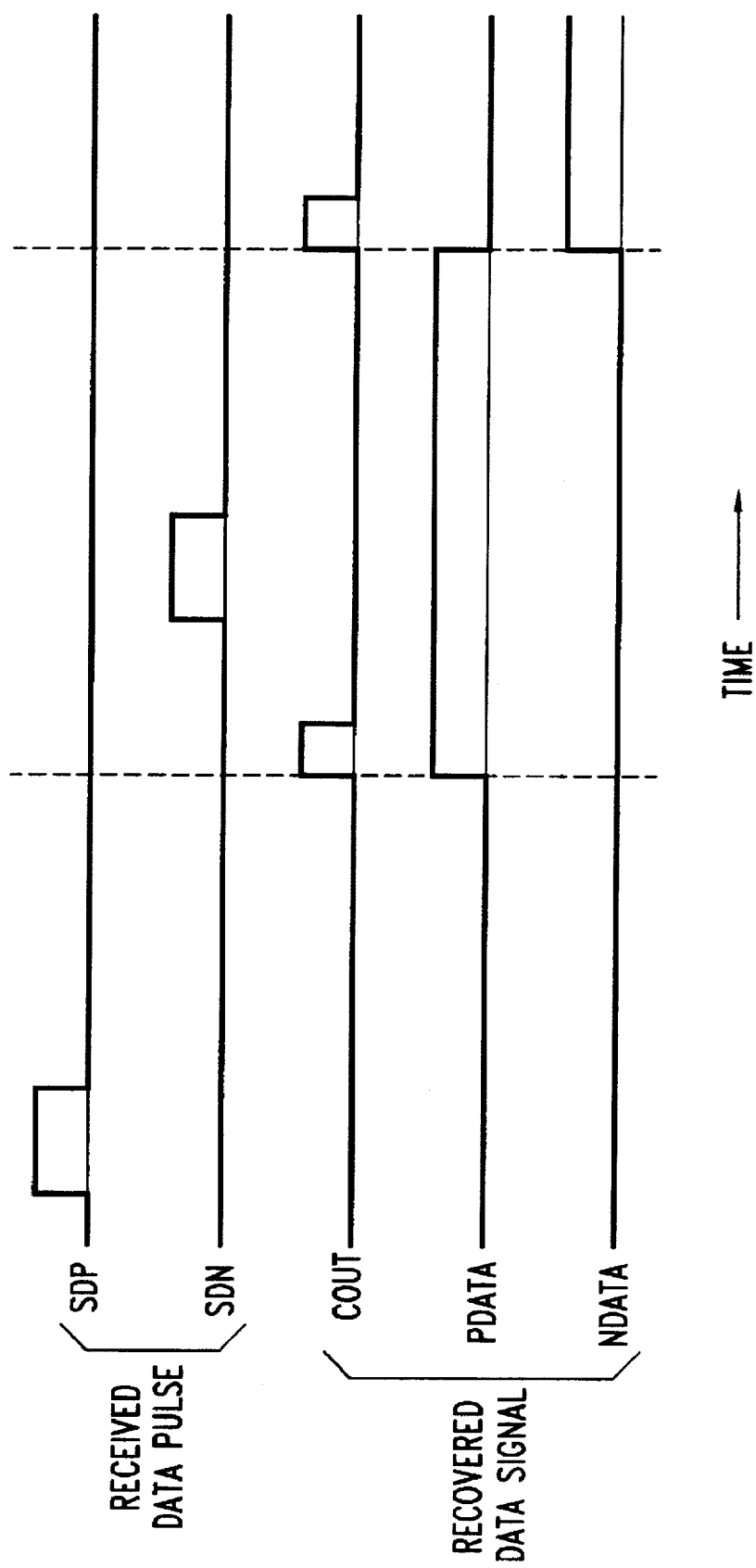

5,689,533

REFINED TIMING RECOVERY CIRCUIT

CROSS REFERENCE TO RELATED APPLICATION

This is a division of application Ser. No. 08/315,783 filed Sep. 30, 1994, now U.S. Pat. No. 5,539,784.

This patent application is being filed concurrently with patent application Ser. No. 08/315,992, entitled "Communications Unit with Data and Clock Recovery Circuit," by Hein et al., filed Sep. 30, 1994, assigned to assignee of the present invention and herein incorporated by reference.

TECHNICAL FIELD

The present invention relates to clock and data timing recovery and, more particularly, to refining the clock and data timing recovery, such as may be employed, for example, in telecommunications.

BACKGROUND OF THE INVENTION

Data and clock signal recovery operations are typically employed in asynchronous transceiver systems. Typically, the receiver timing reference, that is, the clock recovery, in such systems is derived from the incoming or received data pulses and the received data pulses are then retimed to be aligned or synchronous with this derived receiver timing reference. Clock recovery may be implemented, for example, by using an analog phase-locked loop (PLL) or a digital data and clock recovery circuit employing an oversampling clock, referred to as XCLK in this context. The term oversampling clock refers to a reference clock having a clock rate or sampling rate faster than the nominal carrier frequency of the signal to be received. Such digital data and clock recovery circuits are sometimes preferred over analog PLLs for a variety of reasons. For example, voltage or current controlled oscillator (VCO/ICO) trimming may not be required, timing recovery may be substantially immune from false-lock, and substantially immune from silicon processing, temperature, and power supply variations, to recite only a few reasons. Furthermore, the architecture for such digital data and clock recovery circuits may be relatively easy to manufacture and test in comparison with analog PLLs.

Unfortunately, phase quantization error or generated jitter for such a digital data and clock recovery circuit may be significant in asynchronous transceivers. Typically, the less the phase quantization error, the better is the timing recovery that is achieved. It is well-known that the phase quantization error due to oversampling is generally inversely proportional to the oversampling ratio. The oversampling ratio is defined in this context, as the ratio of the XCLK clock pulse frequency, or oversampling clock frequency, to the input or received signal carrier frequency. Thus, by increasing the oversampling frequency, the phase quantization error may be reduced. However, high frequency reference clock sources are difficult to design, and, furthermore, may consume significant amounts of power relative to the power supply, especially in a low-voltage environment. A need therefore exists for a method or technique of reducing the phase quantization error of a digital clock and data timing recovery system other than by simply increasing the oversampling frequency.

SUMMARY OF THE INVENTION

Briefly, in accordance with one embodiment of the invention, a refined timing recovery circuit for retiming a recovered data signal comprises a data pulse edge detector. The recovered data signal is derived from a received data pulse. The data pulse edge detector is adapted to be coupled to an oversampling clock. The data pulse edge detector is further adapted to sense the next clock pulse edge having the closest temporal proximity after a selected received data pulse edge. In accordance with another embodiment, an integrated circuit comprises: a timing recovery system for retiming a recovered data signal derived from a received data pulse. The timing recovery system comprises a refined timing recovery circuit. The refined timing recovery circuit includes a data pulse edge detector. The data pulse edge detector is adapted to be coupled to an oversampling clock having a mutually timed series of clock pulses at a substantially predetermined frequency and is further adapted to sense the next clock pulse edge having closest temporal proximity after a selected received data pulse edge. In accordance with yet another embodiment, a method of reducing the phase quantization error of a recovered data signal derived from a received data pulse by sampling with digital clock pulses at a first substantially predetermined frequency comprising the steps of: sampling the received data pulse with digital clock pulses at a second substantially predetermined frequency so as to sense the next clock pulse edge of the digital clock pulses in closest temporal proximity after a selected edge of the received data pulse, the second substantially predetermined frequency being approximately M times the first substantially predetermined frequency; and retiming the recovered data signal substantially in accordance with the sensed next clock pulse edge.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof, may best be understood by reference to the following detailed description when read with the accompanying drawings in which:

FIGS. 2 and 11 are timing diagrams illustrating the operation of alternative embodiments of a refined timing recovery circuit in accordance with the invention.

FIG. 12 is a timing diagram illustrating received data pulses and recovered data signals, such as may be associated with a timing recovery system in accordance with the invention.

DETAILED DESCRIPTION

Figure 1:
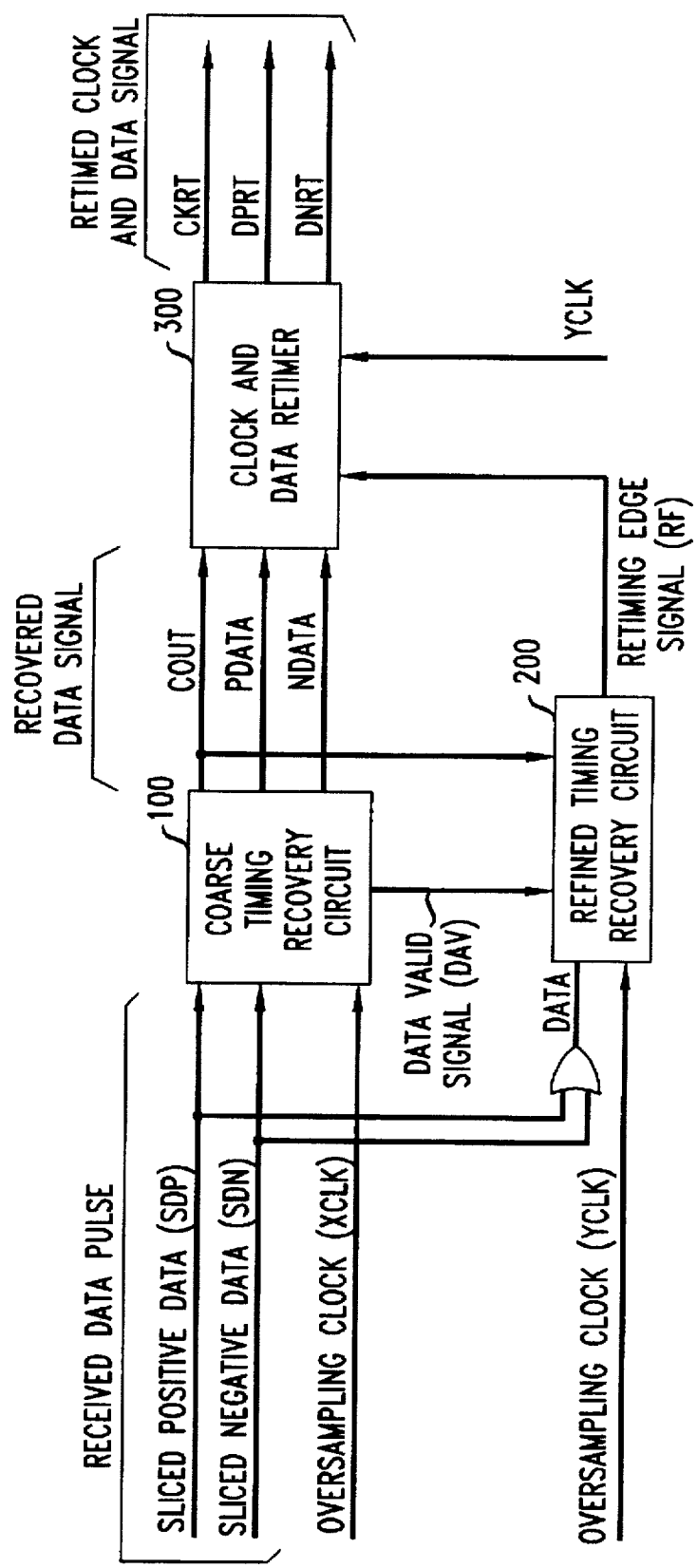
FIG. 1 is a block diagram of an embodiment of a timing recovery system in accordance with the invention including an embodiment of a refined timing recovery circuit in accordance with the invention.

Referring to FIG. 1, a timing recovery system in accordance with the present invention for use in an asynchronous transceiver system may comprise, as illustrated in FIG. 1, a first, or coarse, timing recovery circuit 100, a second, or refined, timing recovery circuit 200, and a retimer 300. In this context, the term "refined timing recovery circuit" refers to a circuit that refines the timing recovery performed by another timing recovery circuit, such as timing recovery circuit 100, for example, illustrated in FIG. 1. As illustrated, timing recovery circuit 100 may be driven by an oversampling clock, illustrated in FIG. 1 as XCLK clock pulses provided at a substantially predetermined oversampling ratio, designated OSAMP in this context. Although the scope of the invention is not restricted in this respect, aforementioned concurrently filed patent application Ser. No. 08/315,992, describes a clock and data timing recovery circuit that may be employed to perform the operations of timing recovery circuit 100 illustrated in FIG. 1. As illustrated by the signals in FIG. 1, a timing recovery circuit, such as circuit 100 in FIG. 1, may sample received positive or negative data pulses, designated SDP and SDN in FIG. 1, with XCLK clock pulses. These data pulses may comprise a standard unipolar signal pulse having a rising edge, a falling edge, and a substantially predetermined amplitude. The circuit may also recover the timing reference, designated COUT in FIG. 1, and "retime" a received positive or negative data pulse to be substantially synchronous with COUT. This retimed pulse is therefore derived from the received data pulse, and may be designated PDATA, NDATA, as illustrated in FIG. 1. It will, of course, be appreciated that the polarity of SDP and SDN is indicated by the input port of timing recovery circuit 100 receiving the data pulse. The SDP and SDN signals may be derived from AMI signals, as described in, for example, MOS Transmission IC's Databook 1991, available from AT&T Microelectronics, Inc., herein incorporated by reference. In this context COUT, PDATA and NDATA together refer to the recovered data signal, whereas SDP and SDN refer to received data pulses. Likewise, COUT refers to the recovered clock signal and PDATA and NDATA respectively refer to the portion of the recovered data signal derived from positive and negative received data pulses that have been retimed. Examples of received data pulses, such as SDP and SDN, are illustrated in FIG. 12, although the scope of the invention is not limited in this respect. The signals shown are provided strictly for purposes of illustration. Likewise, FIG. 12 also illustrates a recovered data signal, including recovered clock signal, COUT, and data pulses, PDATA and NDATA, corresponding to received data pulses, SDP and SDN, respectively.

As previously indicated, one way to reduce the phase quantization error of the recovered data signal relative to the received data pulse is to increase the speed or frequency of the clock pulses provided by XCLK. The disadvantage of this approach is that timing recovery circuit 100 and the remaining circuitry would then operate at this increased speed or frequency. This typically will result in increased power dissipation and may also introduce other technical design problems. A timing recovery system in accordance with the invention, however, such as including refined timing recovery circuit 200 illustrated in FIG. 1, may be employed to reduce the quantization error of the recovered data signal without increasing the frequency of XCLK.

As illustrated in FIG. 1, in this embodiment, refined timing recovery circuit 200 is driven by an externally-derived clock, YCLK, which may be M times faster than XCLK. In this context, M is a positive integer, although the invention is not limited in scope in this respect. Likewise, a refined timing recovery circuit in accordance with the invention may reduce phase quantization error even if M equals 1, although YCLK typically has a higher frequency than XCLK. As will be explained in more detail hereinafter, the frequency of the YCLK clock pulses relative to the XCLK clock pulses may be employed to improve the accuracy with which the edges of the received data pulse or even the received data pulse center may be resolved in time.

Figure 2:
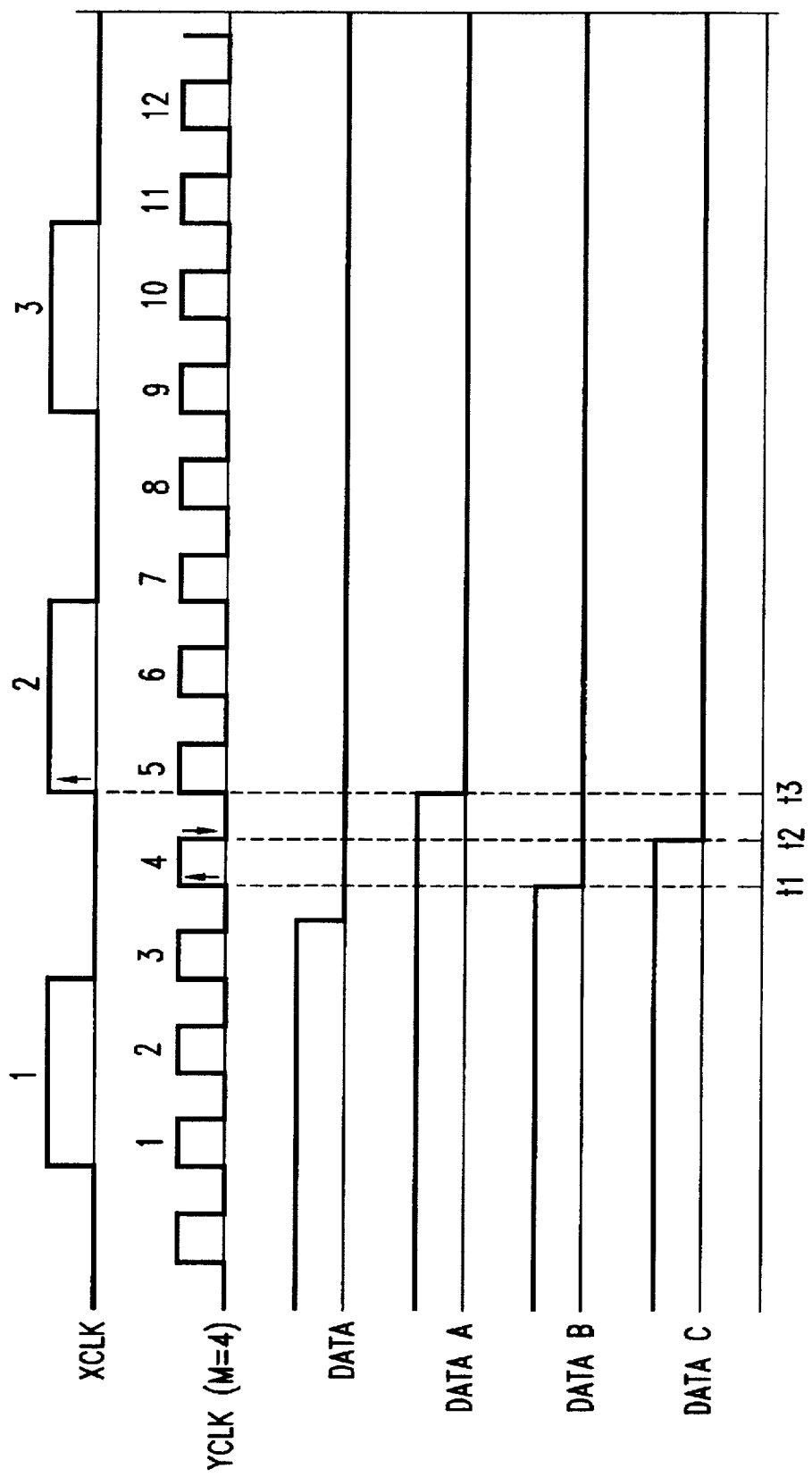

One approach to accomplish this is illustrated in FIG. 2. More particularly, as illustrated, the data pulse signal or data pulse, designated DATA, is sampled by both edges of the YCLK clock pulses to determine the proximity of the data pulse falling edge to the rising edge or falling edge of a YCLK clock pulse. Of course, it will be appreciated that although FIG. 2 shows only a falling edge of the data pulse signal, this approach may likewise be employed for the rising edge of the data pulse, such as illustrated in FIG. 11. As will be explained in more detail hereinafter, the data pulse edge proximity information, once obtained as a signal, may then be employed to retime the recovered data signal obtained from timing recovery circuit 100. As illustrated in FIG. 2, the YCLK clock pulses are four times faster than the XCLK clock pulses, although the scope of the invention is not, of course, limited in this respect. Depicted in FIG. 2 as DATA A is the received data pulse sampled by the XCLK clock pulse. The received data pulse sampled by the rising edge of the YCLK clock pulse is designated DATA B and the received data pulse sampled by the falling edge of the YCLK clock pulse is designated DATA C. As is now evident by examining FIG. 2, sampling of the data pulse by the rising edge of the YCLK clock pulse produces the least phase quantization error with respect to the received data pulse, DATA, among the three alternatives illustrated. Therefore, the phase quantization error produced by timing recovery circuit 100 in this particular example may be reduced by retiming the received data signal to be synchronous with the rising edge of a YCLK clock pulse. Likewise, the phase quantization error may be even further reduced by increasing the YCLK clock frequency, if desired. FIG. 11 illustrates a similar approach with respect to the rising edge of a received data pulse.

FIG. 2 illustrates that the received data pulse and oversampling clock YCLK may be employed to obtain a pulse edge proximity signal to reduce the phase quantization error associated with the recovered data signal produced by timing recovery circuit 100. As described in more detail hereinafter, circuitry to produce this proximity signal is provided, although the invention is not limited in scope to this particular embodiment.

Figure 3:
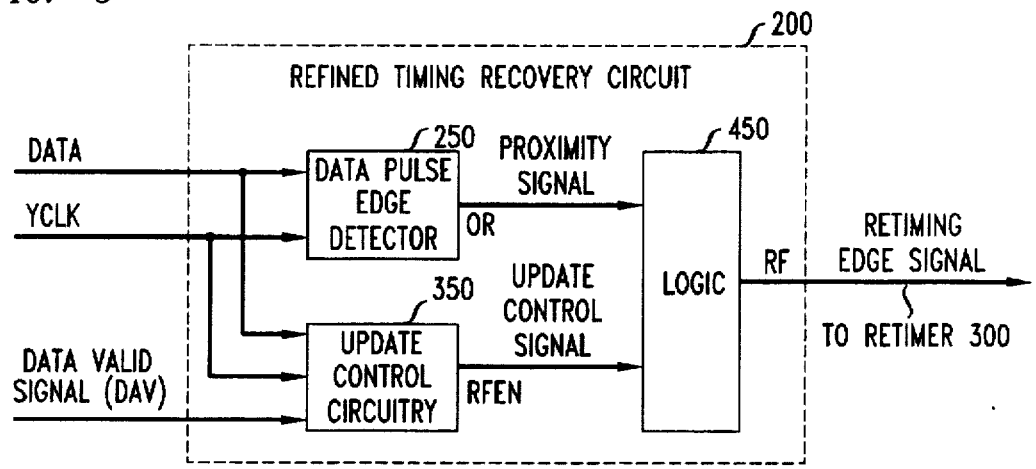
FIG. 3 is a block diagram illustrating in more detail the embodiment of a refined timing recovery circuit in accordance with the invention illustrated in FIG. 1.

FIG. 3 illustrates in more detail the embodiment of a refined timing recovery circuit 200 in accordance with the invention shown in FIG. 1. As illustrated, timing recovery circuit 200 includes a data pulse edge detector 250. In this context, the term "data pulse edge detector" refers to a circuit for sensing the next clock pulse edge of a digital clock pulse provided by an oversampling clock having closest temporal proximity after a selected received data pulse edge. Likewise, it may include a circuit for specifically sensing the next rising clock pulse edge or the next falling clock pulse edge. As illustrated, data pulse edge detector 250 is adapted to be coupled to an oversampling clock, YCLK, providing clock pulses at a substantially predetermined oversampling frequency. Thus, as illustrated, data pulse edge detector 250 is adapted to be coupled to a signal path in the timing recovery system so as to obtain the received data pulse. As further illustrated in FIG. 3, refined timing recovery circuit 200 also includes update control circuitry 350. As will be explained in detail hereinafter, in this particular embodiment of a refined timing recovery circuit in accordance with the invention, update control circuitry 350 is employed to signal an update of the retiming applied to recovered data signals. If update control circuitry 350 signals an update, the recovered data signal is retimed substantially in accordance with the data pulse edge proximity signal being provided by data pulse edge detector 250.

One reason for providing such update control circuitry is due to a timing delay between obtaining the received data pulse and obtaining the recovered data signal. More specifically, a time delay is associated with the processing performed by timing recovery circuit 100; however, refined timing recovery circuit 200 also utilizes the received data pulse at substantially the same time as it is provided to timing recovery circuit 100. In such a situation, refined timing recovery circuit 200, therefore, also includes update control circuitry to signal whether to retime the recovered data signal after processing of the received data pulse by timing recovery circuit 100, because in this particular embodiment the received data pulse may already have been processed by data pulse edge detector 250 for proximity signal information. Thus, as illustrated in FIGS. 1 and 3, timing recovery circuit 100 provides a data valid signal to refined timing recovery circuit 200. As further illustrated in FIG. 3 and explained in more detail hereinafter, the data valid signal is employed by update control circuitry 350 to signal an update of the retiming of the recovered data signal. FIG. 1 also illustrates that COUT may be provided to refined timing recovery circuit 200, although this detail is omitted from FIG. 3. As illustrated in FIG. 1, recovered clock signal COUT may be employed by refined timing recovery circuit 200 to address a propagation delay problem that may arise where different delays affect the signals provided to retimer 300. This problem is avoided by timing any update based on the COUT signal, although this approach is not necessary for a refined timing recovery circuit or a timing recovery system in accordance with the present invention. By this approach, an update will not occur until the signals for retiming the recovered data signal are available to retimer 300 and relatively stable based on the timing provided by recovered clock signal, COUT.

The effect that update control circuitry 350 may have on retiming the recovered data signal is illustrated at a high level in FIG. 3. As illustrated in FIG. 3, and explained in more detail hereinafter, data pulse edge detector 250 produces a proximity signal, designated "OR," providing signal information regarding the temporal proximity of a failing data pulse edge to the rising or falling clock pulse edge of a clock pulse of the YCLK clock signal. (In this context, proximity signal OR should not be confused with the boolean OR function, such as may be performed by a conventional digital logic gate.) Proximity signal OR indicates whether the next occurring clock pulse edge after the data pulse falling edge is a rising or falling edge. This next clock pulse edge is produced by an oversampling clock. Likewise, update control circuitry 350 provides an update control signal RFEN. In this embodiment, proximity signal OR is combined with update control signal RFEN to produce the retiming edge signal, designated RF in FIG. 3. In this particular embodiment, when RFEN is low, the last value of RF provided to retimer 300 is maintained. Thus, no update of the retiming of the recovered data signal occurs. Likewise, when RFEN is high, retiming edge signal RF is updated to the value of proximity signal OR provided by data pulse edge detector 250. As illustrated in FIG. 1, retimer 300 uses the RF signal to select the edge of the YCLK clock pulses, also provided to retimer 300 as illustrated in FIG. 3, to employ to retime the recovered data signal obtained from timing recovery circuit 100. In this context, the term "retimer" or "clock and data retimer" refers to a circuit for retiming the recovered data signal. In this particular embodiment, retimer 300 retimes the recovered data signal to be synchronous with a selected edge of a YCLK clock pulse signaled by edge retiming signal RF.

Figure 7:
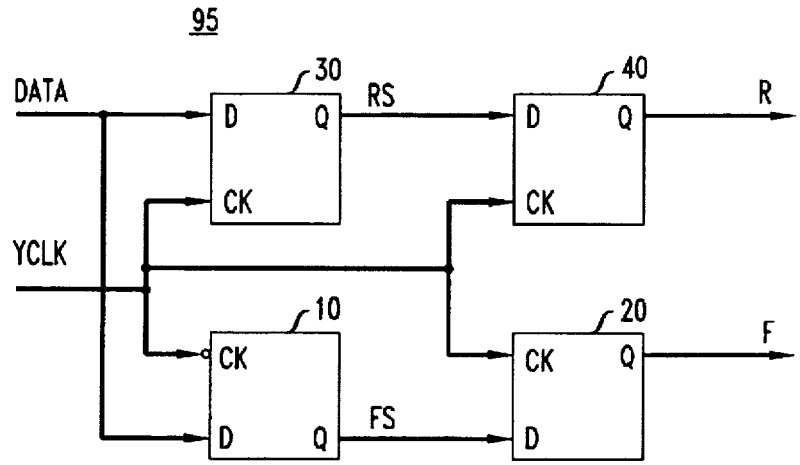
FIG. 7 is a circuit diagram illustrating a portion of an embodiment of a data pulse edge detector, such as may be incorporated in a refined timing recovery circuit in accordance with the invention.
Figure 5:
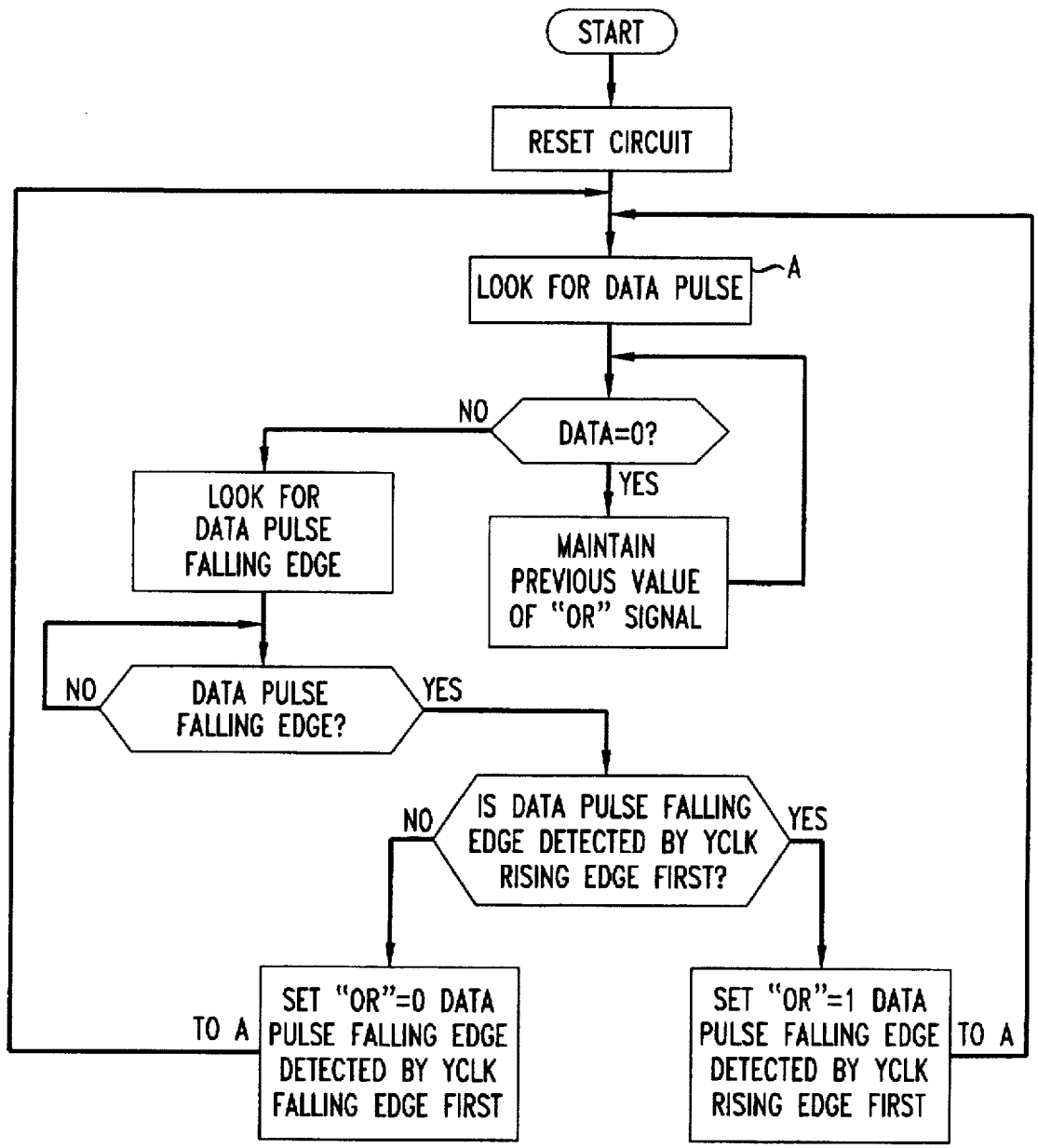
FIGS. 5 and 6 are, respectively, a flow chart and a state diagram illustrating the operation of a portion of an embodiment of a data pulse edge detector, such as may be incorporated in a refined timing recovery circuit in accordance with the invention.
Figure 6:
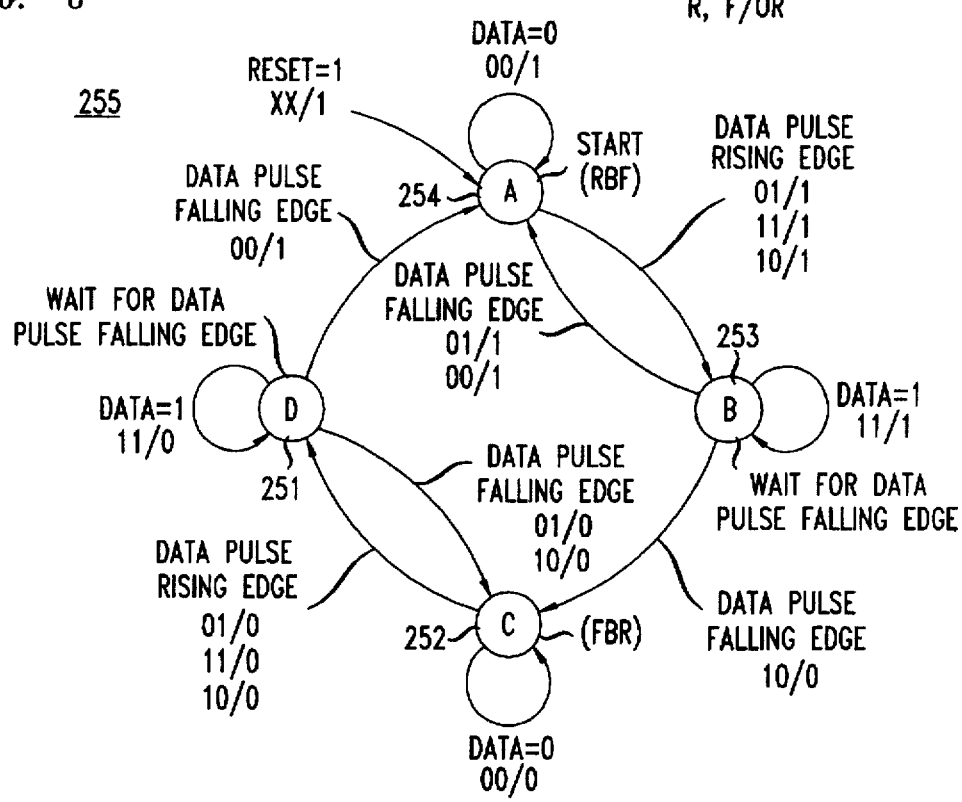

FIG. 5 is a flow diagram illustrating the operation of a portion of an embodiment of a data pulse edge detector for use in a refined timing recovery circuit in accordance with the invention. Likewise, FIG. 6 is a state diagram illustrating the operation of a portion of an embodiment of a data pulse edge detector for use in a refined timing recovery circuit in accordance with the invention and FIG. 7 is a circuit diagram illustrating a portion of an embodiment of a data pulse edge detector for use in a refined timing recovery circuit in accordance with the invention. Although the flow diagram and the state diagram relate to a data pulse falling edge detector, in an alternative approach a data pulse rising edge detector may be employed. Furthermore, the circuit embodiment illustrated in FIG. 7 may be employed as a portion of either a data pulse rising edge detector or a data pulse falling edge detector, as explained in more detail hereinafter.

As illustrated in FIG. 5, a circuit embodiment, such as the one illustrated in FIG. 7, may first be reset. Likewise, the circuit embodiment waits to receive a data pulse. If the data pulse received is a low signal, indicated in the flow chart by a zero, then the current recovered data signal is retimed substantially in accordance with the retiming applied to the last recovered data signal. This is indicated in the flow chart where the previous value of the proximity signal, OR, is maintained, as explained in more detail hereinafter. Alternatively, if the data pulse received is not low, the circuitry will have sensed the data pulse rising edge, at least for this particular embodiment. Therefore, the circuitry then waits for the data pulse falling edge. Once the data pulse falling edge is detected, the circuitry determines whether the falling edge of the data pulse was detected by the rising edge or the falling edge of the YCLK clock pulse first. If the data pulse falling edge was detected by the rising edge of a YCLK clock pulse first, then the proximity signal is set high. Likewise, if the data pulse falling edge was detected by the falling edge of a YCLK clock pulse first, then the proximity signal is set low. Referring now to the circuit embodiment of FIG. 7, a received data pulse, designated DATA, and YCLK clock pulses from an oversampling clock, such as an externally-derived oversampling clock, are provided to this "front end" portion of data pulse edge detector 250.

Figure 4:
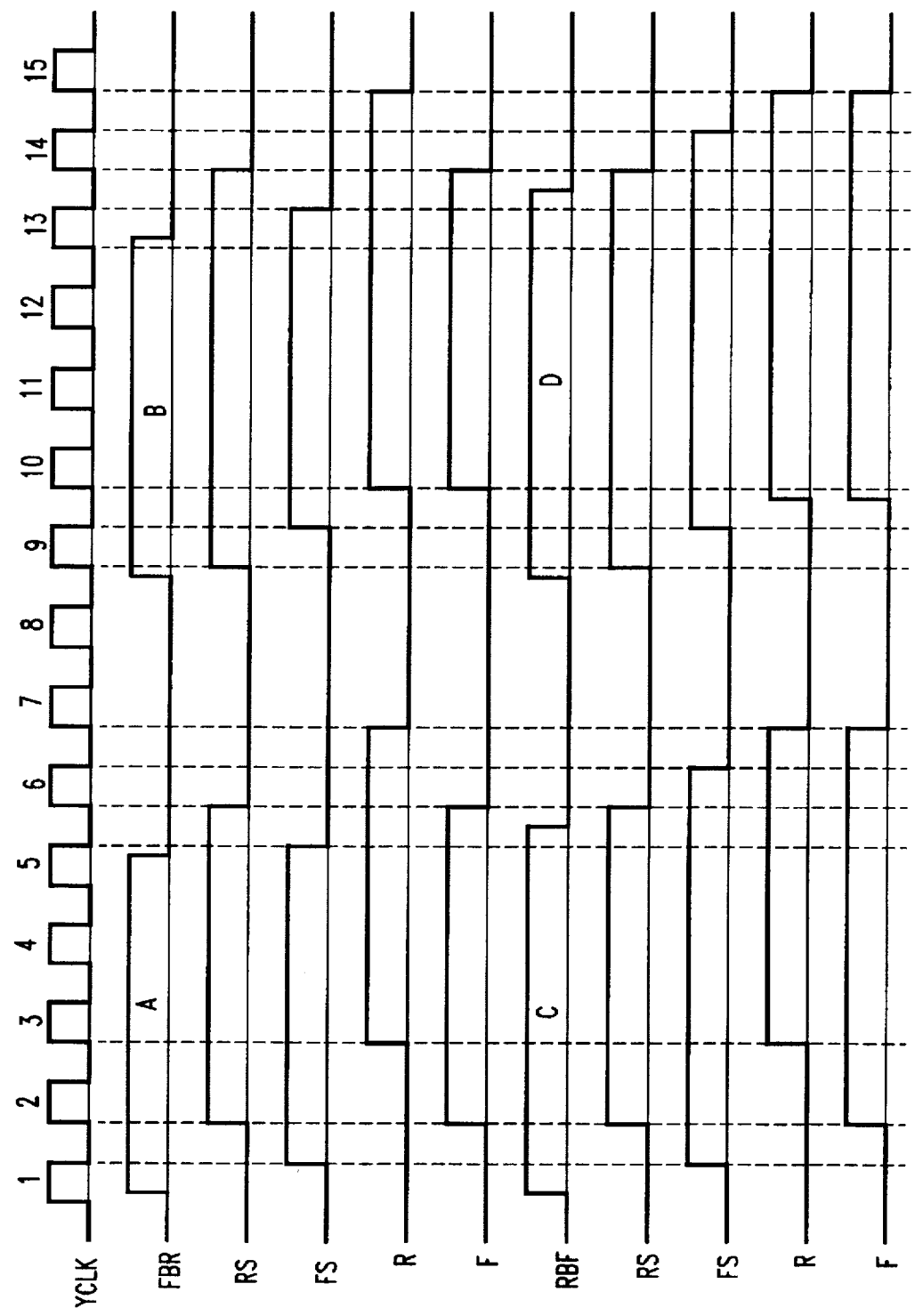
FIG. 4 is a timing diagram illustrating the operation of the circuit embodiment illustrated in FIG. 7.

FIG. 4 is a timing diagram illustrating four types of input data pulses or data pulse signal patterns, designated A, B, C, and D, and the associated signals produced by the circuit embodiment illustrated in FIG. 7, the produced signals being designated RS, FS, R and F. For this particular embodiment, signaling patterns A and B are referred to as fall-before-rise (FBR) patterns, in this context referring to the circumstance that the falling edge of both of these two signal patterns would be "captured" or latched by the falling edge of a YCLK clock pulse before the rising edge of a YCLK clock pulse. Therefore, the falling edge of a YCLK clock pulse is the next clock pulse edge in closest temporal proximity to the falling edge of the data pulse. Likewise, signal patterns C and D are termed rise-before-fall (RBF) patterns, referring to the circumstance that the falling edge of these signaling patterns are "captured" or latched by the rising edge of a YCLK clock pulse before the falling edge of a YCLK clock pulse. Therefore, the rising edge of a YCLK clock pulse is the next clock pulse edge in closest temporal proximity to the falling edge of the data pulse.

FIG. 4 illustrates in more detail the four signaling patterns and the corresponding sequences of signals provided by the portion of a circuit embodiment of a data pulse edge detector illustrated in FIG. 7 that may be incorporated in a refined timing recovery circuit in accordance with the invention. The embodiment illustrated in FIG. 7 includes circuitry providing signals indicating the next clock pulse edge in closest temporal proximity to the falling edge of the data pulse. As illustrated in FIG. 3, a proximity signal obtained based on the signals provided by this circuitry may then be combined with the RFEN signal obtained from the update control circuitry to provide an edge retiming signal (RF) to retimer 300.

As explained in more detail hereinafter, the sequence of signals provided by the circuitry of the embodiment illustrated in FIG. 7 indicates the next clock pulse edge in closest temporal proximity to the falling edge of the data pulse signal. This is accomplished by the flip-flop configuration illustrated. The received data pulse is provided to the data (D) port of flip-flops 10 and 30. Likewise, a YCLK clock signal is provided to the clock (CK) port of flip-flop 30, whereas an inverted YCLK clock signal is provided to the clock (CK) port of flip-flop 10. By this technique, flip-flops 10 and 30 together are operating at effectively twice the frequency of the YCLK clock pulses, that is, one of flip-flops 10 and 30 latches the data pulse on alternative edges of a YCLK clock pulse, although individually each flip-flop is operating at the frequency of the YCLK clock pulses. Therefore, the signals provided at the output (Q) ports of flip-flops 10 and 30 produce signals providing signal information regarding the next clock pulse edge having the closest temporal proximity to the falling edge of the received data pulse. However, as suggested, these signals are being provided at twice the frequency of YCLK. Therefore, the signals designated in FIG. 7 as RS and FS may be provided to the remaining circuitry of the timing recovery system, although that circuitry would then operate at twice the frequency of YCLK as well. An enhancement of this approach is to employ flip-flops 20 and 40, as illustrated. Flip-flops 20 and 40 effectively reduce the frequency of the proximity signals provided by flip-flops 10 and 30 by a factor of two to thereby provide the proximity signal on the rising edge of a YCLK clock pulse, as illustrated in FIG. 4. Of course, the invention is not limited in scope to this particular embodiment.

The signal transition sequence, RS, FS, R, and F, associated with each signaling pattern identified, i.e., A, B, C, and D, is provided in FIG. 4. The state diagram of FIG. 6 therefore illustrates how the signals provided by the circuit embodiment of FIG. 7 may be employed to sense the next clock pulse edge having the closest temporal proximity after the selected data pulse edge, in this case the falling data pulse edge. It will now be appreciated that the circuit embodiment illustrated in FIG. 7 may also be employed to realize a data pulse rising edge detector. Although the same signal transition sequences, RS, FS, R, and F, may be employed, when the circuit embodiment is employed as a data pulse rising edge detector a state diagram other than the state diagram illustrated in FIG. 6 should be employed. For example, in such an embodiment signaling patterns A and C may constitute FBR patterns and signaling patterns B and D may constitute RBF patterns.

As illustrated in FIG. 6, state diagram 255 includes four states designated 251, 252, 253, and 254. An embodiment of a data pulse edge detector to be incorporated in a refined timing recovery circuit in accordance with the invention, in particular a data pulse falling edge detector based on the state diagram illustrated in FIG. 6, may operate to sense either an RBF condition or an FBR condition, as previously described in connection with the description of FIG. 4. Where an RBF condition is sensed, a high OR proximity signal is provided by the edge detector, such as to logic circuitry 450 as illustrated in FIG. 3. Alternatively, where an FBR condition is sensed, a low proximity OR signal may be provided. Of course, the scope of the invention is not limited to a particular signaling convention, such as the convention adopted in this particular embodiment. Likewise, as previously explained, in this embodiment these signals provide signal information regarding the next clock pulse edge of a YCLK clock pulse in closest temporal proximity to the falling edge of the received data pulse.

For this particular embodiment of a data pulse edge detector for use in a refined timing recovery circuit in accordance with the invention, the input signals in accordance with the state diagram in FIG. 6 are the R and F signals provided by the circuit embodiment illustrated in FIG. 7. Also a RESET signal may be provided. The output signal, as previously described, is the proximity signal, OR. For the state diagram illustrated in FIG. 6, the convention "R,F/OR" is therefore employed along each state transistion arc to designate the input/output signal values on a state transition.

The individual states of FIG. 6 are described in more detail below:

State 254: This is the initial state for this embodiment. In State 254, proximity signal OR is high to signal a RBF start up condition. When the rising edge of a data pulse is sensed, the edge detector transitions to State 253. Likewise, this state addresses situations when RESET is active or the data pulse is low. The edge detector remains in this state in these situations.

State 253: This state indicates that a data pulse has been obtained or received. As long as the data pulse remains high, the edge detector remains in this state. When the data pulse falling edge is detected, the edge detector transitions to either State 254 or State 252 according to whether an RBF or FBR condition is sensed.

State 252: This state is similar to State 254 except that this state corresponds to an RBF condition. The edge detector remains in this state as long as data pulse is low and transitions to State 251 when the rising edge of a data pulse is sensed.

State 251: This state indicates that the rising edge of a data pulse has been sensed. As long as the data pulse remains high, the edge detector remains in this state. When a data pulse falling edge is detected, the edge detector transitions to State 254 or State 252 depending on whether an RBF or FBR condition is sensed.

Figure 9:
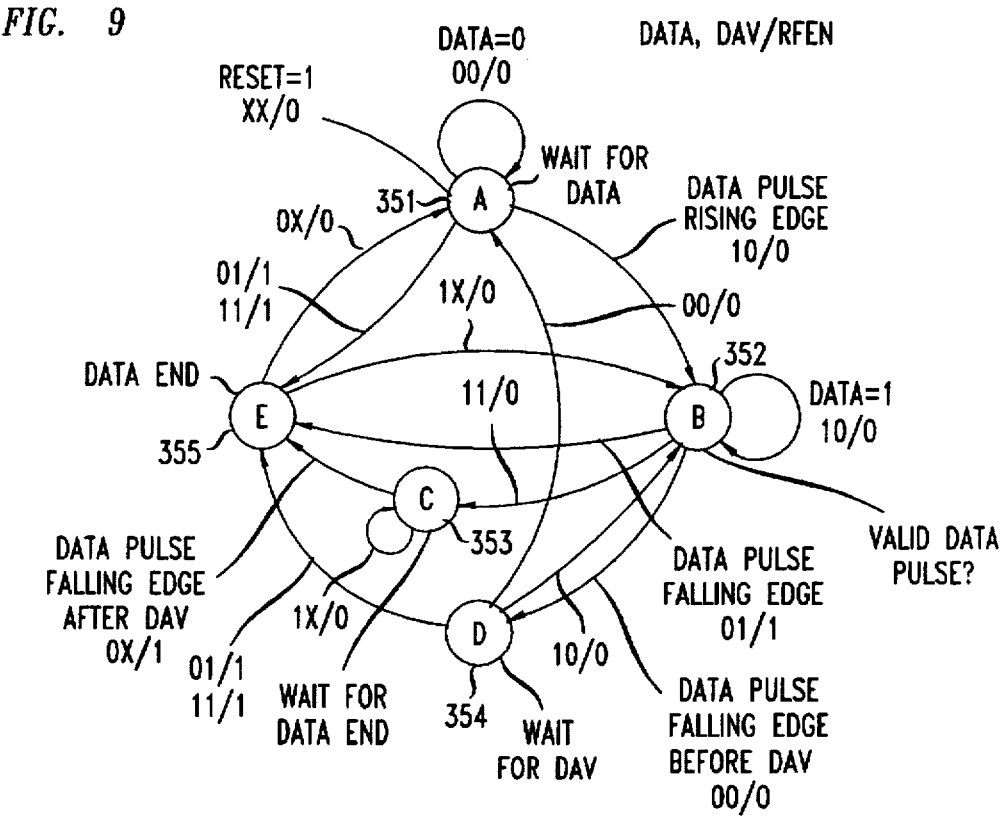
FIGS. 8 and 9 are, respectively, a flow chart and a state diagram illustrating the operation of an embodiment of update control circuitry, such as may be incorporated in a refined timing recovery circuit in accordance with the invention.
Figure 8:
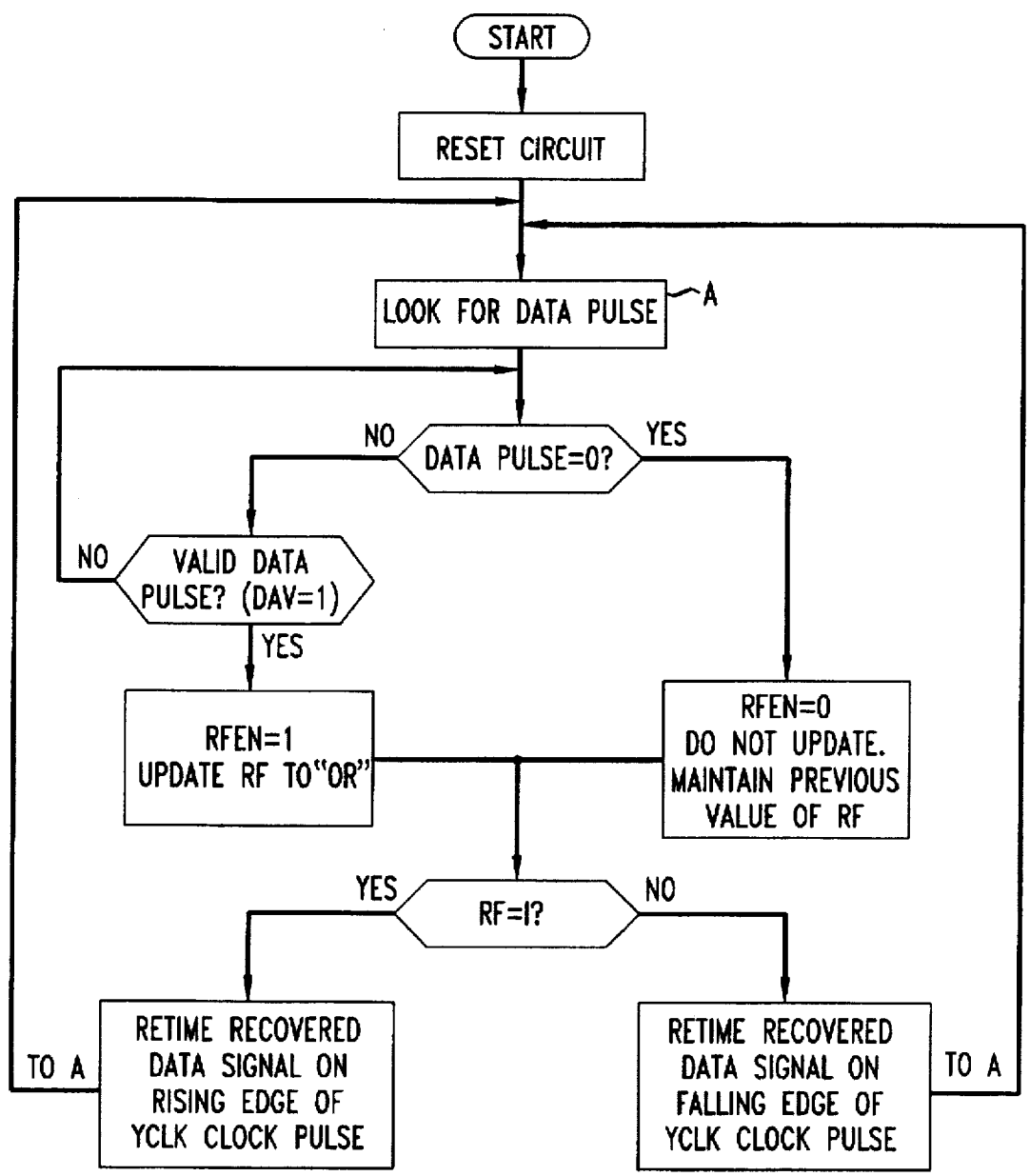

FIG. 8 is a flow diagram illustrating the operation of an embodiment of update control circuitry, such as may be employed in a refined timing recovery circuit in accordance with the invention, and FIG. 9 is its state diagram. It will be appreciated that the invention is not restricted in scope to update control circuitry in accordance with these diagrams and, furthermore, a refined timing recovery circuit in accordance with the invention may not necessarily even employ update control circuitry, depending on the embodiment. As illustrated in FIG. 8 for this embodiment, so long as the data pulse is low the update control circuitry is "reset," that is, update control signal RFEN remains low. The effect of this to to maintain the current value of edge retiming signal RF. This is desirable in this situation because the timing recovery system has not obtained additional timing signal information where the data pulse remains low. However, when the received data pulse is high, the circuitry waits for a valid data signal to be provided, such as by timing recovery circuitry 100, as previously described. If a data valid signal is received, the update control circuitry provides update control signal RFEN, set high in this embodiment. Then, as illustrated in FIG. 3, logic circuitry 450 updates edge retiming signal RF to the value of proximity signal OR based on update control signal RFEN. The updated edge retiming signal RF is provided to retimer 300, as illustrated in FIG. 1. As previously suggested, the invention is not restricted in scope to the particular signaling conventions employed in this particular embodiment.

As previously indicated, FIG. 9 is a state diagram for an embodiment of an update control circuit that may be employed in a refined timing recovery circuit in accordance with the invention. As illustrated in FIG. 3, the input signals to the update control circuitry include a received data pulse, DATA, a data valid signal, DAV, obtained from timing recovery circuit 100, and a reset signal, RESET. Likewise, update control signal RFEN is the output signal provided. For the state diagram illustrated in FIG. 9, the convention "DATA, DAV/RFEN" is employed along each state transistion arc to designate the input/output signal values on a state transition.

The individual states are described in more detail below:

State 351: For this embodiment, this is the initial or default state. In this state, the update control circuitry waits for the received data pulse or for the data valid signal for the data pulse just received. Likewise, where RESET is active or the data pulse is low, the circuitry remains in this state. The initial default value of RFEN is low. When the rising edge of a data pulse is sensed, the update control circuitry transitions to state 352. In State 351, if the data valid signal is high and is received coincidentally with the falling edge of the data pulse or the rising edge of the next data pulse, the update control circuitry provides update control signal RFEN as high to logic circuitry 450 in order to update edge retiming signal RF and transitions to State 355.

State 352: This state indicates that the data pulse has begun. A rising edge of the data pulse has been sensed. The update control circuitry in this state waits for a valid data pulse. As long as a data pulse rising edge has been sensed and the data valid signal is low, the update control circuitry remains in this state. If the falling edge of the data pulse is sensed before a data valid signal occurs, a signaling "glitch" may have occurred. Therefore, the update control circuitry transitions to State 354 for further processing. With the data pulse high, if a data valid signal is received, the update control circuitry transitions to State 353 indicating that a valid data pulse has been received and waits for the data pulse to end. If the data pulse falling edge occurs coincidentally with the data valid signal, a transition to State 355 occurs and update control signal RFEN is set high to signal an update of edge retiming signal RF to the value of proximity signal OR.

State 353: This state signals that a valid data signal has been received. As long as the data pulse is high, the update control circuitry remains in this state. When the falling edge of the data pulse is sensed, a transition to State 355 occurs and update control signal RFEN is set high to signal an update of edge retiming signal RF to the value of proximity signal OR.

State 354: This state provides glitch rejection/tolerance for the update control circuitry. As described above with respect to State 352, a signaling glitch may cause the update control circuitry to transition from State 352 to this state. When in this state, if the data pulse is low, and if the data valid pulse is low and is received within one YCLK cycle, the update control circuitry transitions to State 351 confirming that a signaling glitch has occurred. In this context, this is referred to as a "glitch rejection." Alternatively, if a data pulse is high and the data valid signal is low, this indicates that data pulse signaling has resumed after only a short glitch. Under these circumstances, the update control circuitry returns to State 352. In this context this is referred to as "glitch tolerance." When in State 354, if the data valid signal occurs coincidentally with the falling edge of the current data pulse or the rising edge of the next data pulse, update control signal RFEN is set high to signal an update of edge retiming signal RF and a transition to State 355 occurs.

State 355: This state signifies the end of a valid data pulse. When in this state, a low data pulse causes the update control circuitry to transition to State 351 and a data pulse that is high results in a transition to State 352.

Although the scope of the invention is not necessarily restricted in scope in this respect, logic circuitry 450, such as illustrated in FIG. 3, may comprise, for example, a conventional flip-flop in which proximity signal OR is provided to the data (D) port of the flip-flop and update control signal RFEN is provided to the "ENABLE" port of the flip-flop. Using this configuration, the output (Q) port of the flip-flop produces edge retiming signal RF. Furthermore, as previously indicated, if RFEN is low, then the edge retiming signal RF is not updated to the value of proximity signal OR.

Figure 10:
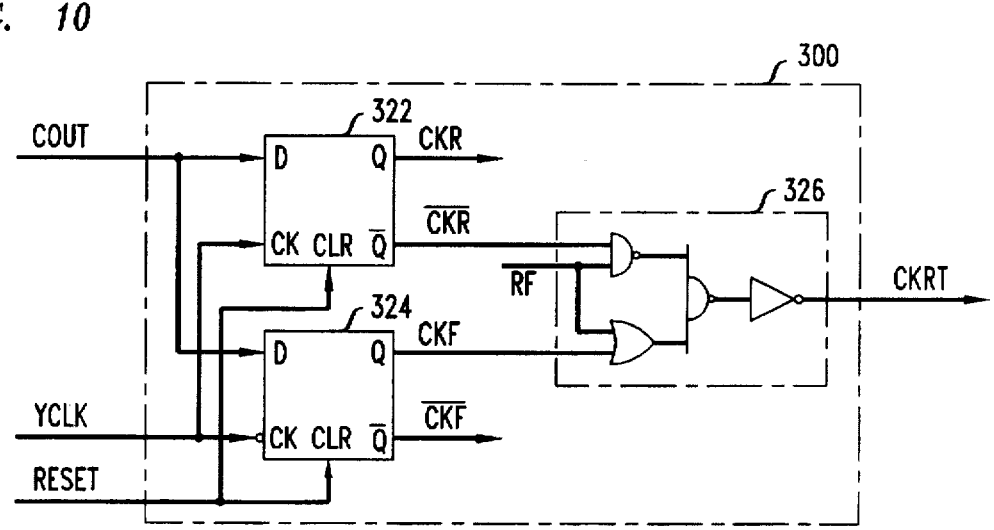
FIG. 10 is a circuit diagram illustrating a portion of an embodiment of a retimer, such as may be incorporated in a timing recovery system in accordance with the invention.

FIG. 10 is a circuit diagram of a portion of an embodiment of retimer 300. As illustrated in FIG. 1 and in more detail in FIG. 10, edge retiming signal RF and YCLK clock pulses are provided to retimer 300. Likewise, the recovered data signal previously described is provided to retimer 300. Based on these signals, retimer 300 may retime the recovered data signal to be aligned with an edge of a YCLK clock pulse. The portion of retimer 300 illustrated in FIG. 10 illustrates retiming for the recovered clock signal COUT. Although not illustrated in FIG. 10, a similar approach may also be applied for signals PDATA and NDATA. As illustrated, flip-flops 322 and 324 retime signal COUT to be synchronous with the rising edge of the YCLK clock pulse and the falling edge of the YCLK clock pulse, respectively. Likewise, these alternatively retimed COUT signals are in effect multiplexed by block 326 based on edge retiming signal RF.

A refined timing recovery circuit in accordance with the invention, such as illustrated in FIG. 3, may be employed to sense the next clock pulse edge having closest temporal proximity to a selected received data pulse edge, such as either the data pulse rising edge or the data pulse falling edge. Nonetheless, the invention is not limited in scope to employing both edges of a clock pulse in this manner. For example, a refined timing recovery circuit in accordance with the invention may alternatively sense the next rising clock pulse edge or the next falling clock pulse edge having closest temporal proximity to a selected received data pulse edge. Such an embodiment in accordance with the invention may still retain advantages in comparison with increasing the frequency of the XCLK clock pulse frequency, although the resolution will be reduced in comparison with an approach which employs both edges of a clock pulse, such as illustrated in FIG. 3, for example.

The phase quantization error of a recovered data signal may be reduced in accordance with the following method. The recovered data signal is derived from a received data pulse by sampling with digital clock pulses at a first substantially predetermined frequency, denoted XCLK clock pulses in this context. The received data pulse may also be sampled with digital clock pulses at a second substantially predetermined frequency, denoted YCLK clock pulses in this context, so as to sense the next clock pulse edge of a digital clock pulse at the second substantially predetermined frequency in closest temporal proximity to a selected edge of the received data pulse. The selected edge may comprise either the rising edge of the data pulse or the falling edge of the data pulse. The second substantially predetermined frequency may be approximately M times the first substantially predetermined frequency, M being a positive integer, although the invention is not restricted in scope in this respect. As previously described, this may be accomplished by a data pulse edge detector that may be incorporated in a refined timing recovery circuit in accordance with the invention. For example, in the embodiment illustrated in FIG. 3, proximity signal OR signal indicates the next clock pulse edge in closest temporal proximity to a selected edge of the received data pulse.

Likewise, the recovered data signal may be retimed to be substantially aligned or synchronous with a clock pulse edge of a digital clock pulse at the second substantially predetermined frequency. The clock pulse edge employed to align or retime the received data signal corresponds to the next clock pulse edge sensed to be in closest temporal proximity to the selected edge of the received data pulse. Thus, the recovered data signal is retimed substantially in accordance with the clock pulse edge sensed as the next clock pulse edge in closest temporal proximity. This may be accomplished a variety of ways, such as the technique employed by the embodiment previously described. In that embodiment, retimer 300 obtains an edge retiming signal RF which indicates whether to retime the recovered data signal on the rising edge of a YCLK clock pulse or the falling edge of a YCLK clock pulse. Once these signals are received, such as signal RF and clock pulses at the YCLK clock frequency, retimer 300 aligns or synchronizes the recovered data signal with the clock pulse edge of a YCLK clock pulse indicated by the edge retiming signal RF. Thus, signals COUT, PDATA, and NDATA, illustrated in FIG. 12, are all aligned or synchronized with an edge of a clock pulse of YCLK to provide the retimed clock and data signals. Likewise, as previously indicated, in this embodiment refined timing recovery circuit 200 also includes update control circuitry 350. In this particular embodiment, the effect of update control circuitry 350 is to delay the retiming step until after the data pulse is validated, in this particular embodiment by timing recovery circuit 100. Alternatively, in another embodiment, the recovered data signal may be retimed regardless of whether it is validated or not, for example.

While only certain features of the invention have been illustrated and described herein, many modifications, substitutions, changes or equivalents will now occur to those skilled in the art. It is, therefore, to be understood that the appended claims are intended to cover all such modifications and changes that fall within the true spirit of the invention.

We claim:

1. A refined timing recovery circuit for retiming a recovered data signal derived from a received data pulse comprising:

a data pulse edge detector, said edge detector being adapted to be coupled to an oversampling clock having a series of clock pulses, each of the clock pulses having a rising edge and a falling edge;

said edge detector including:

a first two flip-flops, each with an output port, a data port being coupled to receive the received data pulse, and a clock port being coupled to receive the oversampling clock pulses;

a second two flip-flops, each with an output port, a data port coupled to the corresponding output port of the first two flip-flops, and a clock port being coupled to receive the oversampling clock pulses;

wherein each of the first two flip-flops is coupled to latch a received data pulse on different oversampling clock pulse edges; and the second of two flip-flops is coupled to latch the output of the first two flip-flops on the same oversampling clock pulse edge.

2. The refined timing recovery circuit as recited in claim 1, wherein said data pulse edge detector comprises a data pulse rising edge detector.

3. The refined timing recovery circuit as recited in claim 1, wherein said data pulse edge detector comprises a data pulse falling edge detector.

4. The refined timing recovery circuit as recited in claim 1, further comprising logic circuitry, responsive to the output ports of the second two flip-flops and to the oversampling clock pulses, providing at an output an indication, after detection of an edge with a predetermined polarity of the received data pulse, of the oversampling clock pulse edge in closest temporal proximity to the detected received data pulse edge.

5. The refined timing recovery circuit as recited in claim 4, wherein the logic circuitry is a state machine.

6. The refined timing recovery circuit as recited in claim 4, wherein the predetermined edge of the received data pulse is the falling edge.

7. The refined timing recovery circuit as recited in claim 4, wherein the predetermined edge of the received data pulse is the rising edge.

* * * * *